US012415618B2

(12) United States Patent
Liu et al.

(10) Patent No.: US 12,415,618 B2
(45) Date of Patent: *Sep. 16, 2025

(54) AIRCRAFT NIGHT FLIGHT CONTROL METHOD AND APPARATUS, CONTROL APPARATUS, AND AIRCRAFT

(71) Applicant: SZ DJI TECHNOLOGY CO., LTD., Shenzhen (CN)

(72) Inventors: Yucheng Liu, Shenzhen (CN); Chuantang Xiong, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,401

(22) Filed: May 6, 2024

(65) Prior Publication Data

US 2024/0294269 A1 Sep. 5, 2024

Related U.S. Application Data

(63) Continuation of application No. 17/125,297, filed on Dec. 17, 2020, now Pat. No. 11,975,866, which is a
(Continued)

(51) Int. Cl.
*B64D 47/06* (2006.01)
*G05D 1/00* (2024.01)
(Continued)

(52) U.S. Cl.
CPC .......... *B64D 47/06* (2013.01); *G05D 1/0016* (2013.01); *G05D 1/223* (2024.01); *G05D 25/02* (2013.01);
(Continued)

(58) Field of Classification Search
CPC ........ B64D 47/06; H05B 47/105; G05D 1/00; G05D 1/16; G05D 25/02; B64U 2101/30
See application file for complete search history.

(56) References Cited

U.S. PATENT DOCUMENTS 6,252,525 B1 * 6/2001 Philiben ............... G01S 1/7032
340/961
9,407,826 B1 8/2016 Tiana
(Continued)

FOREIGN PATENT DOCUMENTS

CN 104994311 A 10/2015
CN 105516667 A 4/2016
(Continued)

OTHER PUBLICATIONS

The World Intellectual Property Organization (WIPO) International Search Report for PCT/CN2018/093722 Mar. 21, 2019 5 pages.

*Primary Examiner* — Tan Q Nguyen
(74) *Attorney, Agent, or Firm* — ANOVA LAW GROUP, PLLC

(57) ABSTRACT

A control method includes in response to the aircraft being in a night flight mode, acquiring a current flight state of an aircraft, the aircraft being provided with a visual sensor and a light supplementation lamp; in response to the aircraft being in a first flight state, controlling the light supplementation lamp to emit light according to a light supplementation rule; and in response to the aircraft being in a second flight state, controlling the light supplementation lamp to emit light according to an alerting rule. The light supplementation rule is configured to control the light supplementation lamp to emit light at a first brightness or emit light with a first frequency. The alerting rule is configured to control the light supplementation lamp to emit light at a second brightness higher than the first brightness or to emit light with a second frequency higher than the first frequency.

20 Claims, 6 Drawing Sheets

Related U.S. Application Data continuation of application No. PCT/CN2018/093722, filed on Jun. 29, 2018.

(51) Int. Cl.
 *G05D 1/223* (2024.01)
 *G05D 25/02* (2006.01)
 *H05B 47/105* (2020.01)
 *B64U 101/30* (2023.01)

(52) U.S. Cl.
 CPC ....... H05B 47/105 (2020.01); *B64U 2101/30* (2023.01)

(56) References Cited

U.S. PATENT DOCUMENTS

| | | | |
|---|---|---|---|
| 2005/0093718 A1* | 5/2005 | Martin | H05B 45/3577 340/981 |
| 2015/0097951 A1 | 4/2015 | Barrows | |
| 2015/0187187 A1 | 7/2015 | Del et al. | |
| 2017/0233099 A1 | 8/2017 | Kuhara et al. | |
| 2018/0074519 A1 | 3/2018 | Qin et al. | |
| 2019/0094889 A1 | 3/2019 | Pohl et al. | |
| 2019/0227555 A1 | 7/2019 | Sun et al. | |
| 2021/0107643 A1 | 4/2021 | Nagai et al. | |
| 2021/0394923 A1 | 12/2021 | Yang | |
| 2022/0252242 A1* | 8/2022 | Tsukamoto | F21V 23/004 |
| 2022/0380062 A1* | 12/2022 | Joshi | B64D 47/04 |

FOREIGN PATENT DOCUMENTS

| | | |
|---|---|---|
| CN | 105874779 A | 8/2016 |
| CN | 105911798 A | 8/2016 |
| CN | 106210556 A | 12/2016 |
| CN | 107037845 A | 8/2017 |
| CN | 107632482 A | 1/2018 |
| CN | 207148497 U | 3/2018 |
| CN | 108015981 A | 5/2018 |
| WO | 2016205415 A1 | 12/2016 |

\* cited by examiner

AIRCRAFT NIGHT FLIGHT CONTROL METHOD AND APPARATUS, CONTROL APPARATUS, AND AIRCRAFT

CROSS-REFERENCE TO RELATED APPLICATION

This application is a continuation of application Ser. No. 17/125,297, filed on Dec. 17, 2020, which is a continuation of International Application No. PCT/CN2018/093722, filed on Jun. 29, 2018, the entire contents of both of which are incorporated herein by reference.

TECHNICAL FIELD

The present disclosure relates to the field of control technology and, more particularly, to an aircraft night flight control method, an apparatus, a control apparatus, and an aircraft.

BACKGROUND

With development of electronic technology and communication technology, aircrafts have been greatly developed, especially some consumer-level remote-controllable aircrafts that can perform various tasks on many occasions, such as performing video filming, geological monitoring, power inspection, etc., through aircrafts carrying cameras.

At a same time as the development of aircrafts, it also brings about some safety problems caused by the aircrafts. To avoid safety problems caused by civilian aircrafts, many places have also introduced some administrative measures to regulate use of the civilian aircrafts. For example, measures have been introduced around the world to prohibit unmanned aerial vehicles (UAVs) from flying within a certain range of airports. In addition, when using aircrafts such as UAVs, etc., there are some hidden safety hazards in a night flight mode of the aircrafts. How to effectively ensure safety of aircrafts in a night flight mode has become a hot issue of research.

SUMMARY

In accordance with the disclosure, there is provided an aircraft control method. The method includes: acquiring a current flight state of the aircraft, in response to the aircraft being in a night flight mode, the aircraft being provided with a visual sensor and a light supplementation lamp configured to provide a fill light function for the visual sensor; controlling the light supplementation lamp to emit light according to a light supplementation rule of the light supplementation lamp, in response to the aircraft being in a first flight state; and controlling the light supplementation lamp to emit light according to an alerting rule of the light supplementation lamp, in response to the aircraft being in a second flight state. The light supplementation rule is configured to control the light supplementation lamp to implement the fill light function in the night flight mode, and the alerting rule is configured to control the light supplementation lamp to implement an aircraft flight alerting function in the night flight mode.

Also in accordance with the disclosure, there is provided a control apparatus. The apparatus includes a controller and a memory. The controller is configured, when executing program instructions stored in the memory, to perform: acquiring a current flight state of the aircraft, in response to the aircraft being in a night flight mode, the aircraft being provided with a visual sensor and a light supplementation lamp configured to provide a fill light function for the visual sensor; controlling the light supplementation lamp to emit light according to a light supplementation rule of the light supplementation lamp, in response to the aircraft being in a first flight state; and controlling the light supplementation lamp to emit light according to an alerting rule of the light supplementation lamp, in response to the aircraft being in a second flight state. The light supplementation rule is configured to control the light supplementation lamp to implement the fill light function in the night flight mode, and the alerting rule is configured to control the light supplementation lamp to implement an aircraft flight alerting function in the night flight mode.

BRIEF DESCRIPTION OF THE DRAWINGS

To illustrate the technical solution of the present disclosure more clearly, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

To ensure flight stability and safety of an aircraft, various types of sensors can be provided on the aircraft, and flight auxiliary parameters can be acquired based on sensing data generated by these sensors. A flight controller configured in the aircraft can generate more accurate flight control instructions to control a flight of the aircraft based on these flight auxiliary parameters. Based on these more accurate flight control instructions, the aircraft is enabled to fly more safely and smoothly. These sensors include a common motion sensor, such as an acceleration sensor, a gyroscope, etc., as well as a visual sensor, such as a sensor composed of a binocular camera. Among them, to ensure that a visual sensor can work normally in various light environments, the embodiments of the present disclosure also provide a light supplementation lamp (e.g. a fill light) on an aircraft equipped with a visual sensor, so that the light supplementation lamp also enables the visual sensor to collect image data relatively normally in cloudy days or at night. In some embodiments, the light supplementation lamp provided on the aircraft may include a flash light.

Figure 1:
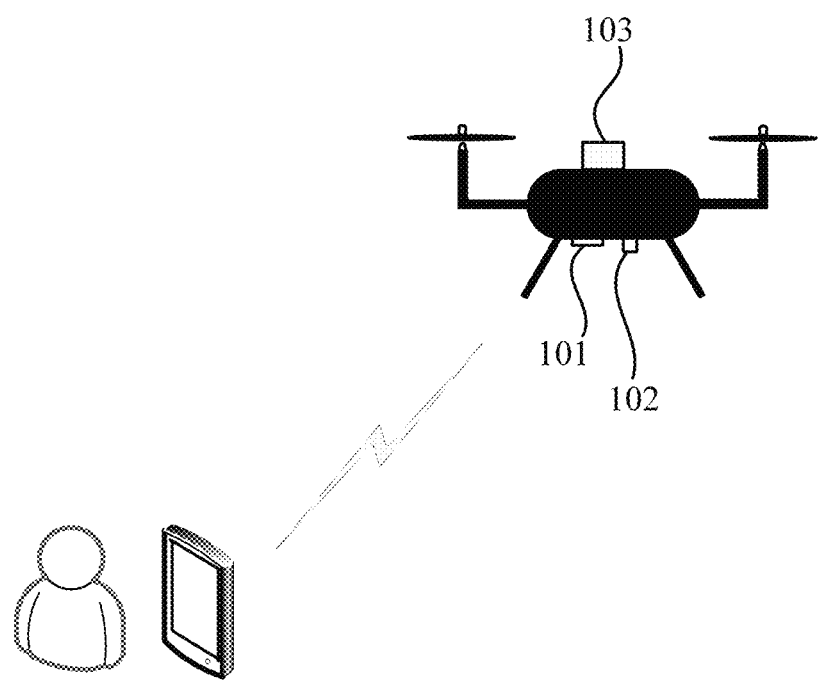
FIG. 1 is a schematic structural diagram of an aircraft including a visual sensor and a light supplementation lamp according to various exemplary embodiments of the present disclosure.

In one embodiment, a visual sensor and a light supplementation lamp are structurally provided at a bottom of an aircraft. After the aircraft takes off, the visual sensor can sense characteristic images about a ground, and a flight state of the aircraft such as hovering, returning home, etc., can be controlled based on a large number of feature points of these characteristic images. Under this structure, the light supplementation lamp can supplement light for the visual sensor in a dark environment, so that the visual sensor can capture clearer ground images. FIG. 1 is a schematic structural diagram of an aircraft including a visual sensor and a light supplementation lamp according to various exemplary embodiments of the present disclosure. As shown in FIG. 1, an aircraft is provided with a visual sensor 101 and a light supplementation lamp 102. In other embodiments, the visual sensor and the light supplementation lamp can also be provided on a side or a top of the aircraft. For example, when provided on the side of the aircraft, images in a flying direction of the aircraft can be detected, and obstacles can be identified to facilitate an obstacle avoidance flight. In some embodiments, the visual sensor and the light supplementation lamp may be installed on a gimbal attached to the bottom of the aircraft, so the direction of the visual sensor can be adjusted according to the movement of the gimbal, such as ground-facing, facing forward in accordance with the flight direction, or facing backward from the flight direction, etc.

Figure 2:
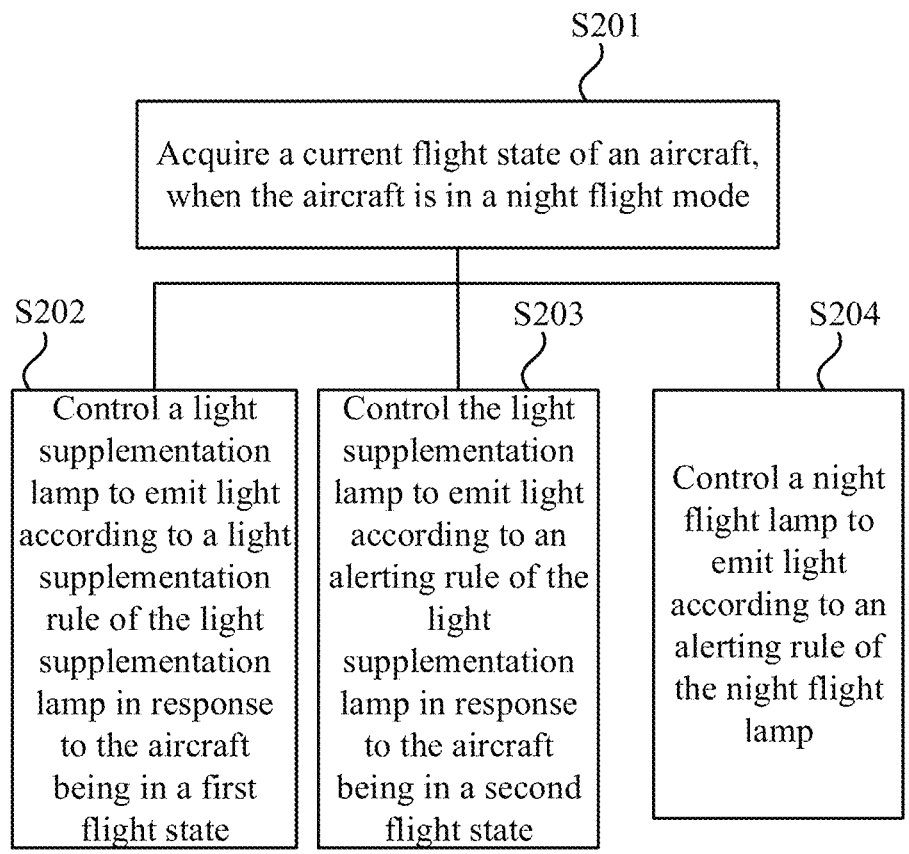
FIG. 2 is a schematic flowchart of an aircraft control method according to various exemplary embodiments of the present disclosure.

FIG. 2 is a schematic flowchart of an aircraft control method according to various exemplary embodiments of the present disclosure. Referring to FIG. 2, the method in the embodiments of the present disclosure may be executed by a control apparatus. The control apparatus may be an independent device capable of data interaction with the aforementioned aircraft including the light supplementation lamp, and capable of controlling light emission of the light supplementation lamp in the aircraft. The control apparatus may also be built in the above-mentioned aircraft including the light supplementation lamp, for example, the control apparatus is built in a flight controller of the aircraft. The control apparatus may also be a remote controller. For example, when a control relationship between a smart terminal, such as a smart phone, a tablet computer, a smart wearable device, etc., and the aircraft is established, the smart terminal may be used as a control apparatus to accomplish corresponding controlling of the light supplementation lamp and a night flight lamp.

When an aircraft user needs to control the aircraft to fly at night or when ambient light is dark, in the embodiments of the present disclosure, on one hand, it is desirable to ensure that the visual sensor can work well, and on another hand, it is also desirable to be able to determine a position of the aircraft by means of light emission in a dark environment (i.e., the aircraft lighting up its lamp to glow in the dark), or to enable other aircrafts or users to see the aircraft by means of light emission.

To achieve the desired effects, in the embodiments of the present disclosure, the control apparatus may acquire a current flight state of the aircraft in S201 when the aircraft is in a night flight mode. The night flight mode of the aircraft can be manually turned on by a user. In one embodiment, a corresponding night flight function button can be configured on an application (APP) that controls the aircraft. After detecting that a user has clicked on the night flight function button, the aircraft is considered to be in the night flight mode. It is also possible to configure a mode switch on the aircraft. After a user turns on the mode switch, the flight controller and other devices on the aircraft can send a notification that the aircraft is currently in the night flight mode, so that the control apparatus determines that the aircraft is in the night flight mode. Alternatively, the night flight mode can be automatically turned on when the aircraft is started to fly in a low-light environment. For example, if a propeller has started to work, the aircraft is considered to be started to fly, and the night flight mode is automatically entered. The flight controller and other devices send a notification to the control apparatus after the night flight model is automatically turned on, so that the control apparatus determines that the aircraft is in the night flight mode. For another example, the control apparatus determines that a flight is in the night flight mode when detecting that current ambient light is weak and the aircraft is started to fly. The ambient light can be sensed by a light sensor. When a sensed ambient light value is lower than a preset value, the night flight mode can be triggered automatically. In the embodiments of the present disclosure, a flight of the aircraft in the night flight mode does not specifically mean that the flight must be at night. When the aircraft is in the night flight mode, it may be on a nighttime course; it may also be flying in an environment with weak ambient light. It is also possible that a user has turned on the night flight mode by mistake, and even if the current aircraft is flying in sufficient ambient light, the aircraft is considered to be in the night flight mode.

A flight state can mainly refer to a take-off state, an air flight state, a high-altitude flight state, a landing state, etc., of the aircraft. In one embodiment, the flight state of the aircraft in the night flight mode can be confirmed according to a flight parameter, and different flight states can be distinguished by setting one or more flight parameter thresholds. Specifically, the flight parameter include an altitude of the aircraft, and/or a flying distance between the aircraft and a control terminal, and different flight states are distinguished by setting one or more altitude thresholds and/or flying distance thresholds. The altitude thresholds may include various thresholds between a first altitude threshold and an eighth altitude threshold as described below, and the flying distance thresholds may include various thresholds between a first distance threshold and an eighth distance threshold as described below.

In response to the aircraft being determined to be in a first flight state, the control apparatus may, in S202, control the light supplementation lamp to emit light according to a light supplementation rule of the light supplementation lamp, and the light supplementation rule of the light supplementation lamp is a rule configured to control the light supplementation lamp to implement a fill light function in the night flight mode. The fill light function refers to supplementing light for the visual sensor provided on the aircraft and may also be referred as light supplementation function. In the embodiments of the present disclosure, a current flight state of the aircraft may be determined according to a flight parameter of the aircraft, and the flight parameter include a flying altitude of the aircraft, and/or a flying distance between the aircraft and a control terminal. Next, taking the flight parameter including the flying altitude as an example, control methods of the light supplementation lamp and the night flight lamp in the first flight state and a second flight state are illustrated schematically.

The first flight state may refer to a state of the aircraft in a low-altitude flight. In the first flight state, the above-mentioned visual sensor mounted on the aircraft can work normally, and can capture clear feature images including a large number of image feature points, so that enough number of feature points can be extracted from the feature images, and the visual sensor can normally accomplish a flight auxiliary work of the aircraft in the first flight state. In some embodiments of the present disclosure, whether the aircraft is in the first flight state is determined based on whether the visual sensor can work normally. An effective first altitude threshold can be determined based on flight-assisting performance of the visual sensor to the aircraft during an actual flight of the aircraft. When the altitude of the aircraft is within the first altitude threshold, the aircraft can be controlled more accurately based on ground image data collected by the visual sensor. After the altitude of the aircraft exceeds the first altitude threshold, feature points in images captured by the visual sensor are significantly reduced, and accuracy of control operations performed on the aircraft is significantly reduced.

In some embodiments of the present disclosure, regarding determination of the first flight state and the second flight state of the aircraft, a valid first altitude threshold and/or a valid first distance threshold can be comprehensively determined, based on flight-assisting performance of the visual sensor on the aircraft and whether the light supplementation lamp can effectively issue the user a light emission alert for a location of the aircraft during an actual flight of the aircraft (that is, the user can spot/notice the light emitted by the light supplementation lamp). When the altitude of the aircraft is within the first altitude threshold, and/or the flying distance between the aircraft and the control terminal is less than the first distance threshold, more accurate control operations can be performed on the aircraft based on the visual sensor, and the user can also see normally the position of the aircraft, at this time, it can be determined that the flight state of the aircraft is the first flight state. When the altitude of the aircraft exceeds a second altitude threshold, and/or the flying distance between the aircraft and the control terminal is greater than a second distance threshold, assistance provided by images taken by the visual sensor to the control operations of the aircraft is significantly weakened, and also the user may not clearly see the aircraft, at this time, the aircraft is considered to be in the second flight state.

In the embodiments of the present disclosure, the first altitude threshold and the second altitude threshold may be equal, or the second altitude threshold may be slightly larger than the first altitude threshold. The first distance threshold and the second distance threshold may be equal, or the second distance threshold may be slightly greater than the first distance threshold.

The light supplementation rule of the light supplementation lamp is a light emission rule mainly configured to ensure that the visual sensor can work normally. Generally, it can be a constant light emission to ensure that the visual sensor can clearly capture ground images. If the visual sensor does not acquire ground images at a higher image acquisition frequency, but acquires ground images at a time interval that exceeds a preset duration, then the light supplementation rule of the light supplementation lamp can be based on the time interval configured for the visual sensor and implement periodic light emission of the light supplementation lamp of the aircraft, to ensure that the visual sensor of the aircraft can work normally.

In response to that the aircraft is determined to be in the second flight state, the control apparatus may be in S203 to control the light supplementation lamp to emit light according to an alerting rule of the light supplementation lamp, and the alerting rule of the light supplementation lamp is a rule configured to control the light supplementation lamp to implement an aircraft flight alerting function in the night flight mode. The second flight state may refer to a state other than the first flight state. In one embodiment, a flight state when the aircraft is higher than the second altitude threshold is the second flight state. In the second flight state, the configured alerting rule of the light supplementation lamp is mainly used to ensure that the light supplementation lamp can be used as a light emission reminder, so that it can remind other aircrafts, or ground control users, or others related users to discover existence of the aircraft through light emission of the light supplementation lamp at night or in a dark environment. The alerting rule of the light supplementation lamp can be a light emission rule that controls the aircraft to emit light at higher brightness, or a light emission rule that controls the aircraft to flash and emit light with a higher flashing frequency (higher than a frequency threshold) and higher brightness, to ensure that a light emission reminder about the aircraft can be completed.

In one embodiment, the second flight state may be divided into multiple sub-states, and based on different sub-states, the alerting rule of the light supplementation lamp may have different alternative light emission control strategies. For example, in a first sub-state of the second flight state, light emission brightness is first light emission brightness and/or a flashing frequency is a first frequency, and in a second sub-state of the second flight state, light emission brightness is second light emission brightness and/or a flashing frequency is a second frequency. The first light emission brightness is different from the second light emission brightness, and the first frequency and the second frequency are also different. For example, when an altitude of the aircraft at the first sub-state is less than an altitude of the aircraft at the second sub-state, the first light emission brightness may be less than the second light emission brightness, and/or the first frequency may be less than the second frequency for flashing the light supplementation lamp.

In addition, in the embodiments of the present disclosure, in addition to controlling light emission of the light supplementation lamp deployed on the aircraft, the control apparatus can also control a night flight lamp 103 dedicated for the night flight mode and deployed on the aircraft as shown in FIG. 1. The night flight lamp 103 is provided on a top of the aircraft to ensure that the aircraft can send out relevant light emission reminders/alerts in the night flight mode. The light supplementation lamp 102 and the night flight lamp 103 can be provided on opposite sides of the aircraft, which can enable the aircraft to send out light emission reminders on different sides of a flight (such as a top or a bottom) in the night flight mode, to remind control users or other users of the existence of the aircraft. In S204, the control apparatus can control the night flight lamp to emit light according to an alerting rule of the night flight lamp, and the alerting rule of the night flight lamp is a rule configured to control the night flight lamp to implement an aircraft flight reminder function in the night flight mode. In one embodiment, the flight reminder function is a same function as the aforementioned flight alerting function, both of which are to prompt a flight position of the aircraft in the night flight mode, to remind different users of the existence of the aircraft. S204 is optional, and in other embodiments, the night flight lamp deployed on the aircraft can be controlled in other ways. For example, after the aircraft enters the night flight mode, the night flight lamp is directly controlled to be constantly on. The night flight lamp can be provided on the top of the aircraft, so that even if the night flight lamp is constantly on and emits light emission reminders, it does not cause discomfort to eyes of the user who controls the aircraft or other users around it. In one embodiment, the alerting rule of the night flight lamp and the alerting rule of the light supplementation lamp may be consistent on control strategies for light emission brightness and/or flashing frequencies, and the alerting rule of the night flight lamp may also be significantly different from the alerting rule of the light supplementation lamp.

Figure 3:
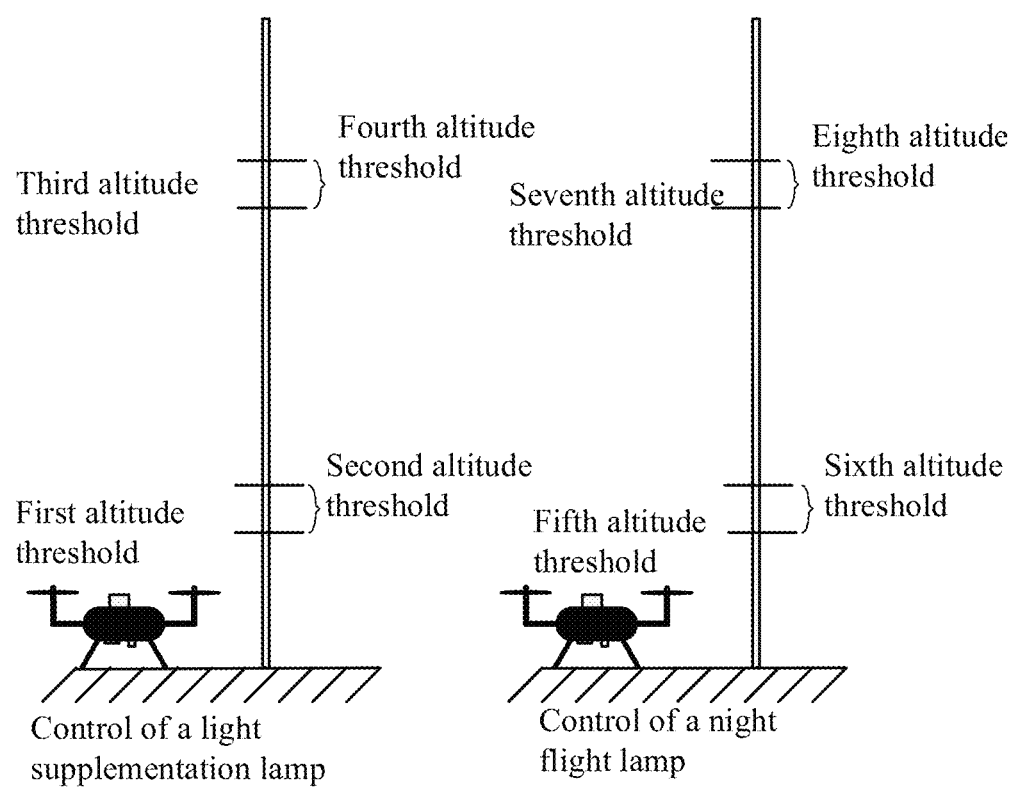
FIG. 3 is a schematic diagram of controlling a light supplementation lamp and a night flight lamp on an aircraft according to various exemplary embodiments of the present disclosure.

FIG. 3 is a schematic diagram of controlling a light supplementation lamp and a night flight lamp on an aircraft according to various exemplary embodiments of the present disclosure. At least the light supplementation rule of the light supplementation lamp and the alerting rule of the light supplementation lamp are configured to control the light supplementation lamp. The alerting rule of the night flight lamp is configured to control the night flight lamp.

Controlling of the light supplementation lamp will be described first. When the aircraft is in the first flight state, that is, when the altitude of the aircraft is less than the first altitude threshold, the control apparatus controls the light supplementation lamp to be constantly on according to the light supplementation rule of the light supplementation lamp, so that the fill light function is provided to the visual sensor installed on the aircraft. The first altitude threshold corresponding to the first flight state may be, for example, 4.5 m, which is an empirical value configured to enable normal operations of the visual sensor. Visual sensors with different visual parameters may have different empirical values about the first altitude. For example, a corresponding first altitude threshold configured for a visual sensor with a higher resolution may be higher than an empirical value corresponding to a visual sensor with a lower resolution, for example, higher than 4.5 m. In one embodiment, the control apparatus may dynamically adjust the first altitude threshold by reading visual parameters of the visual sensor currently mounted on the aircraft.

When the altitude of the aircraft is greater than the second altitude threshold and the aircraft is in the second flight state, the control apparatus controls the light supplementation lamp to emit light according to the alerting rule of the light supplementation lamp. The second altitude threshold may be equal to the first altitude threshold. Or the second altitude threshold is slightly higher than the first altitude threshold, as shown in FIG. 3, that the second altitude threshold is a value within a certain target altitude range starting from the first altitude threshold, for example, in FIG. 3, a value within an altitude range indicated from an altitude scale line corresponding to the first altitude threshold to a next altitude scale line.

In the embodiments of the present disclosure, in a process of controlling the light supplementation lamp to emit light according to the alerting rule of the light supplementation lamp, based on different altitudes, the second flight state of the aircraft may have at least two sub-states. For each sub-state, the alerting rule of the light supplementation lamp is configured with different indications of light emission brightness and/or flashing frequencies. In one embodiment, when the altitude of the aircraft is greater than the second altitude threshold and less than a third altitude threshold, the control apparatus controls the light supplementation lamp to emit light at brightness indicated by a preset medium brightness level according to the alerting rule of the light supplementation lamp. A preset flashing frequency can also be indicated in the alerting rule of the light supplementation lamp, so that both the flashing frequency and the brightness of the light supplementation lamp can be controlled.

In other words, when the altitude of the aircraft is greater than the second altitude threshold and less than the third altitude threshold, the aircraft is considered to be in a first sub-state of the second flight state, and the flashing frequency and/or the light emission brightness are controlled for the light supplementation lamp, the flashing frequency is a first frequency, for example, the first frequency is 20 times per minute, and the light emission brightness is first brightness, for example, the first brightness is 30% of maximum brightness of the light supplementation lamp, which is medium brightness. The control of the flashing frequency and the brightness in the first sub-state is only for some embodiments. The control apparatus can also control the light supplementation lamp by combining different flashing frequencies. For example, different flashing frequencies, such as a flashing frequency of 20 times per minute in a first minute, a flashing frequency of 25 times per minute in a second minute, etc., are combined.

In a second sub-state of the second flight state, when the altitude of the aircraft is greater than a fourth altitude threshold, the control apparatus controls the light supplementation lamp to emit light at brightness indicated by a preset high brightness level according to the alerting rule of the light supplementation lamp. A flashing frequency can be preset in the alerting rule of the light supplementation lamp, so that the flashing frequency and the brightness of the light supplementation lamp can be controlled at a same time. The fourth altitude threshold is also an empirical value. Under the fourth altitude threshold, even if any control is performed on the brightness of the light supplementation lamp, it would not cause adverse effects such as glare to a controlling user or some other users on the ground. At a same time, under the fourth altitude threshold, it can be ensured that other aircrafts, users, etc., as far away as possible (for example, 3 miles or 5 kilometers away), can see light emission of the light supplementation lamp, and the light supplementation lamp can give light emission reminders of the aircraft. For example, the fourth altitude threshold may be an altitude value that is 50 m away from the ground, or a corresponding altitude value that is 50 m away from the controlling user. The fourth altitude threshold may equal to the third altitude threshold, or may be slightly higher than the third altitude threshold, and a distance between the fourth altitude threshold and the third altitude threshold is within a target altitude range.

In other words, when the altitude is greater than the fourth altitude threshold, the aircraft is considered to be in the second sub-state of the second flight state. At this time, the flashing frequency indicated by the alerting rule of the light supplementation lamp is a second frequency, and the light emission brightness is a high brightness level, that is, the maximum brightness (100% brightness) of the light supplementation lamp. The second frequency may be the same as the first frequency, and the second frequency may also be higher than the first frequency, for example, 45 times per minute. The alerting rule of the light supplementation lamp may also indicate that the light supplementation lamp is always on at the maximum brightness at this time.

Controlling of the night flight lamp will be explained next. Controlling of the night flight lamp by the control apparatus is mainly carried out in accordance with the alerting rule of the night flight lamp. In one embodiment, the alerting rule of the night flight lamp can also be subdivided into a first alerting rule of the night flight lamp and a second alerting rule of the night flight lamp. Light emission parameters indicated by the first alerting rule of the night flight lamp are different from light emission parameters indicated by the second alerting rule of the night flight lamp, and the light emission parameters include brightness and/or a flashing frequency to control light emission of the night flight lamp. In response to the aircraft being in the first flight state, the night flight lamp is controlled according to the first alerting rule of the night flight lamp. In response to the aircraft being in the second flight state, the night flight lamp is controlled according to the second alerting rule of the night flight lamp. In one embodiment, for alerting control of the night flight lamp, as described above, the aircraft may include multiple sub-states when the aircraft is in the second flight state, for example, it may include a first sub-state and a second sub-state. When the night flight lamp is controlled to emit light according to the second alerting rule of the night flight lamp, the second alerting rule of the night flight lamp also indicates different light emission brightness and/or flashing frequencies, for different sub-states.

Different light emission strategies are also defined for the night flight lamp in the alerting rule of the night flight lamp, and the night flight lamp emits light with different brightness and/or flashing frequencies. In one embodiment, when the aircraft is in a take-off state, for example, within a range between propellers start to rotate and a ground clearance is a fifth altitude threshold, the aircraft can be considered to be in the take-off state (the take-off state may also correspond to the first flight state mentioned above), that is, when the altitude of the aircraft is less than the fifth altitude threshold, it is determined that the aircraft is in the first flight state. At this time, based on instructions of the first alerting rule of the night flight lamp in the alerting rule of the night flight lamp, the night flight lamp of the aircraft is controlled to flash light at brightness indicated by a low brightness level (for example, 10% of maximum brightness of the night flight lamp), and/or a flashing frequency can be set at a lower frequency, such as 15 times per minute, mainly used to indicate that the night flight lamp is working normally. When the user turns on the aircraft or it is detected that the propellers of the aircraft start to rotate, light emission of the night flight lamp can be directly controlled with the lower flashing frequency and/or brightness, thereby reminding that the night flight lamp of the aircraft is in a normal working condition. If the night flight lamp cannot emit light at the lower flashing frequency and/or brightness, for example, the night flight lamp does not emit light within a preset time range (such as 3 seconds) after the propellers start to rotate, it is equivalent to reminding the user that the night flight lamp functions abnormally.

When the altitude of the aircraft is greater than a sixth altitude threshold and less than a seventh altitude threshold, the control apparatus may determine that the aircraft is in a normal cruising state (the normal cruising state may correspond to the second flight state mentioned above), and at this time, control the night flight lamp to emit light with brightness indicated by a preset medium brightness level, according to the second alerting rule of the night flight lamp of the alerting rule of the night flight lamp, corresponding to the first sub-state of the second flight state of the aircraft. The sixth altitude threshold may be equal to the fifth altitude threshold. The sixth altitude threshold may alternatively be slightly higher than the fifth altitude threshold, and a distance between the sixth altitude threshold and the fifth altitude threshold is within a target altitude range. The medium brightness level may, for example, be 30% of the maximum brightness of the night flight lamp. In some embodiments, the sixth altitude threshold may be equal to the first altitude threshold or the second altitude threshold mentioned above, or may be slightly higher than the first altitude threshold or the second altitude threshold. In this case, brightness and/or a flashing frequency indicated by the second alerting rule of the night flight lamp are the same as the brightness and/or the flashing frequency to control the light supplementation lamp when the aircraft is between the second altitude threshold and the third altitude threshold mentioned above. For example, the medium brightness level is 30% of the maximum brightness of the night flight lamp.

When the altitude of the aircraft is greater than an eighth altitude threshold, the control apparatus may determine that the aircraft is in the second sub-state of the second flight state, and control the night flight lamp to emit light at brightness indicated by a preset high brightness level, following the instructions of the second alerting rule of the night flight lamp in the alerting rule of the night flight lamp. The eighth altitude threshold may be equal to the seventh altitude threshold. The eighth altitude threshold may alternatively be slightly higher than the seventh altitude threshold, and a distance between the eighth altitude threshold and the seventh altitude threshold is within a target altitude range. The high brightness level may correspond to 100% of the maximum brightness of the night flight lamp. The eighth altitude threshold may also be equal to the third altitude threshold or the fourth altitude threshold, or slightly higher than the third altitude threshold or the fourth altitude threshold. In this case, controlling of light emission brightness of the night flight lamp by the control apparatus can be the same as a control strategy to control the light supplementation lamp by the control apparatus when the altitude of the aircraft is greater than the fourth altitude threshold.

In the embodiments of the present disclosure, a principle of controlling the light supplementation lamp and the night flight lamp on the aircraft based on different flying distances between the aircraft and the control terminal is the same as an above-mentioned principle of controlling the light supplementation lamp and the night flight lamp on the aircraft based on the altitude of the aircraft. For alternative implementations of controlling the light supplementation lamp and the night flight lamp on the aircraft according to different flying distances between the aircraft and the control terminal, reference may also be made to FIG. 3 and descriptions of corresponding embodiments.

In one embodiment, when the flying distance between the aircraft and the control terminal can be acquired, controlling of the light supplementation lamp according to the alerting rule of the light supplementation lamp to emit light may include: when the flying distance between the aircraft and the control terminal is greater than a second distance threshold and less than a third distance threshold, according to the instructions of the alerting rule of the light supplementation lamp, controlling the light supplementation lamp to emit light at brightness indicated by the preset medium brightness level, where a corresponding flashing frequency may also be preset in the alerting rule of the light supplementation lamp, so that the flashing frequency of the light supplementation lamp can also be controlled; or, when the flying distance between the aircraft and the control terminal is greater than a fourth distance threshold, according to the instructions of the alerting rule of the light supplementation lamp, controlling the light supplementation lamp to emit light at brightness indicated by the preset high brightness level, and/or controlling the light supplementation lamp to emit light at a flashing frequency preset in the alerting rule of the light supplementation lamp. In some scenarios, for example, in a scenario where a user controls the aircraft to fly into the air (controls the aircraft to fly vertically or at a certain tilt angle), the second distance threshold and the second altitude threshold may be equal, and the third distance threshold and the third altitude threshold may be equal, and the fourth distance threshold and the fourth altitude threshold may be equal.

In some embodiments of the present disclosure, according to needs, the light supplementation lamp is controlled to emit light at brightness indicated by the preset medium brightness level, according to the instructions of the alerting rule of the light supplementation lamp, only when both conditions are satisfied: the altitude of the aircraft being greater than the second altitude threshold and less than the third altitude threshold, and the flying distance being greater than the second distance threshold and less than the third distance threshold; and/or, the light supplementation lamp is controlled to emit light at brightness indicated by the preset high brightness level, according to the instructions of the alerting rule of the light supplementation lamp, only when the altitude of the aircraft is greater than the fourth altitude threshold, and the flying distance between the aircraft and the control terminal is greater than the fourth distance threshold.

In one embodiment, in a scenario that the flying distance between the aircraft and the control terminal can be acquired, when the aircraft is in the first flight state, controlling light emission of the night flight lamp according to the first alerting rule of the night flight lamp may include: when the flying distance between the aircraft and the control terminal is less than a fifth distance threshold, according to instructions of the first alerting rule of the night flight lamp, controlling the night flight lamp to emit light at brightness indicated by a preset low brightness level. In some scenarios, such as a scenario where a user controls the aircraft to fly into the air, the fifth distance threshold and the fifth altitude threshold may be equal.

In addition, in the embodiments of the present disclosure, according to needs, only when the altitude of the aircraft is less than the fifth altitude threshold, and the flying distance between the aircraft and the control terminal is less than the fifth distance threshold, the night flight lamp is controlled to emit light at brightness indicated by the preset low brightness level, according to the instruction of the first alerting rule of the night flight lamp.

In one embodiment, in a scenario that the flying distance between the aircraft and the control terminal can be acquired, when the aircraft is in the second flight state, controlling light emission of the night flight lamp according to the second alerting rule of the night flight lamp may include: when the flying distance between the aircraft and the control terminal is greater than a sixth distance threshold and less than a seventh distance threshold, according to instructions of the second alerting rule of the night flight lamp, controlling the night flight lamp to emit light at brightness indicated by a medium brightness level; or, when the flying distance between the aircraft and the control terminal is greater than an eighth distance threshold, according to the instructions of the second alerting rule of the night flight lamp, controlling the night flight lamp to emit light at brightness indicated by a preset high brightness level. Similarly, in some scenarios, such as a scenario where a user is controlling the aircraft to fly into the air, the sixth distance threshold and the sixth altitude threshold may be equal, the seventh distance threshold and the seventh altitude threshold may be equal, and the eighth distance threshold and the eighth altitude threshold may be equal.

In addition, in the embodiments of the present disclosure, according to needs, only when the altitude of the aircraft is greater than the sixth altitude threshold and less than the seventh altitude threshold, and the flying distance between the aircraft and the control terminal is greater than the sixth distance threshold and less than the seventh distance threshold, according to the instructions of the second alerting rule of the night flight lamp, the night flight lamp is controlled to emit light at brightness indicated by the preset medium brightness level; or, only when the altitude of the aircraft is greater than the eighth altitude threshold and the flying distance between the aircraft and the control terminal is greater than the eighth distance threshold, according to the instructions of the second alerting rule of the night flight lamp, the night flight lamp is controlled to emit light at brightness indicated by the preset high brightness level.

The method according to the embodiments of the present disclosure is described as an example with some alternative numbers exemplified below.

When a UAV takes off at night, a user can choose to turn on a night flight lamp on an APP. After the night flight lamp is selected to be turned on, a control apparatus can control a night flight lamp to flash at a low brightness (10%, user adjustable) to indicate that a flashing function of the night flight lamp is turned on. The user operates the UAV to take off, and during a take-off phase, the control apparatus can control the night flight lamp to flash at low brightness (10%, user adjustable), and the control apparatus can also control a downward-view light supplementation lamp of the UAV to be constantly on within a distance of 0.1~4.5 m (adjustable by the user) from a ground during the take-off phase, to ensure that a downward-view visual module of the UAV (e.g. visual sensor) can work normally. Above 4.5 meters, the control apparatus can control the downward-view light supplementation lamp of the UAV to exit a light supplementation mode, and flash with medium brightness (30%, user adjustable), and control the night flight lamp to also flash with medium brightness (30%, user adjustable). When a distance from the ground or the user is 50 m (adjustable by the user) and above, the control apparatus can control the night flight lamp and the light supplementation lamp to flash at full brightness (100%, adjustable by the user), so that upper and lower hemispheres of the UAV can meet light emission reminder requirements in the night flight mode.

During a landing of the UAV at night, when the distance from the ground or the user is 50 m or more, the control apparatus can control the night flight lamp and the light supplementation lamp to flash at full brightness (100%, user adjustable). When the UAV is at a distance of 50 m~4.5 m from the ground or the user, the control apparatus can control the downward-view light supplementation lamp of the UAV to flash at medium brightness (30%, user adjustable), and the control apparatus can control the night flight lamp to flash at medium brightness (30%, user adjustable). At a distance between 4.5 m~0 m, the control apparatus can control the downward-view light supplementation lamp of the UAV to stay on during a landing phase to ensure the downward-view visual module of the UAV can work normally, and the control apparatus can control the night flight lamp to flash at lower brightness (10%, user adjustable) to prevent glare effect from glare to the user and interfere with normal use at night.

Figure 4:
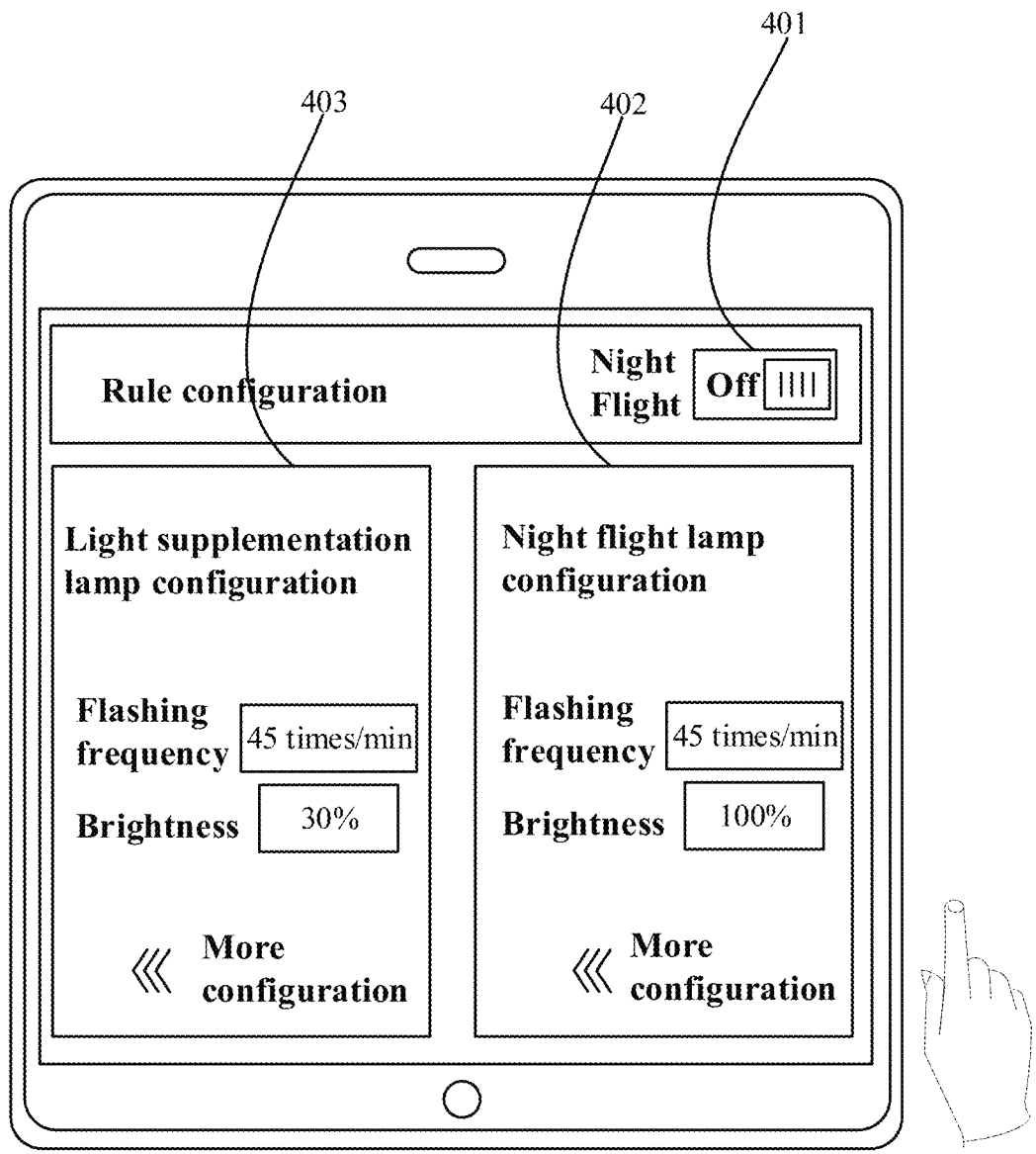
FIG. 4 is a schematic diagram of a user interface according to various exemplary embodiments of the present disclosure.

The above-mentioned alerting rule of the light supplementation lamp and the alerting rule of the night flight lamp can be configured by default when the control apparatus is produced. In other embodiments, it can also be configured based on needs of a user, so that the user can implement other functions through the light supplementation lamp and the night flight lamp, such as a lighting function, a night light show function, and so on. FIG. 4 is a schematic diagram of a user interface according to various exemplary embodiments of the present disclosure. A user interface includes a night flight function button 401, a light emission rule configuration interface 402 of the night flight lamp, and a light emission rule configuration interface 403 of the light supplementation lamp. After the night flight function button 401 is selected (e.g., toggled from "Off" to "On" status), a night flight function can be turned on, and it is determined that the aircraft is in the night flight mode. By default, the control apparatus controls the light supplementation lamp according to the above-mentioned light supplementation rule of the light supplementation lamp and the alerting rule of the light supplementation lamp, and controls the night flight lamp according to the alerting rule of the night flight lamp. In some embodiments, the user interface may further include a function switch button (not shown in FIG. 4). In response to that the user selects the function switch button, the control apparatus controls the light supplementation lamp based on a new light supplementation rule of the light supplementation lamp and a new alerting rule of the light supplementation lamp, and controls the night flight lamp based on a new alerting rule of the night flight lamp, based on brightness and/or flashing frequencies and other parameters set by the user on the light emission rule configuration interface 402 of the night flight lamp and/or the light emission rule configuration interface 403 of the light supplementation lamp.

Based on the above-mentioned aircraft including the night flight lamp, the light supplementation lamp, and the visual sensor, and based on controlling of light emission of the night flight lamp and the light supplementation lamp based on the light supplementation rule of the light supplementation lamp, the alerting rule of the light supplementation lamp, and the alerting rule of the night flight lamp, a position of the aircraft in a night sky or a dark environment can be effectively marked, the light supplementation lamp is effectively used, needs for the aircraft to arrange other night flight lamps on an opposite side of the night flight lamp are eliminated, and weight and UAV power consumption are reduced. In addition, when configuring the alerting rule of the light supplementation lamp and the alerting rule of the night flight lamp, situations when the aircraft is close to the ground or the user are considered, avoiding operation troubles caused by close glare flashing to the user. The alerting rule of the light supplementation lamp takes normal use of the downward-view light supplementation lamp into account. Through the embodiments of the present disclosure, a fuselage layout of the aircraft is not wasted, use functions are not reduced, and additional burden is not added.

Figure 5:
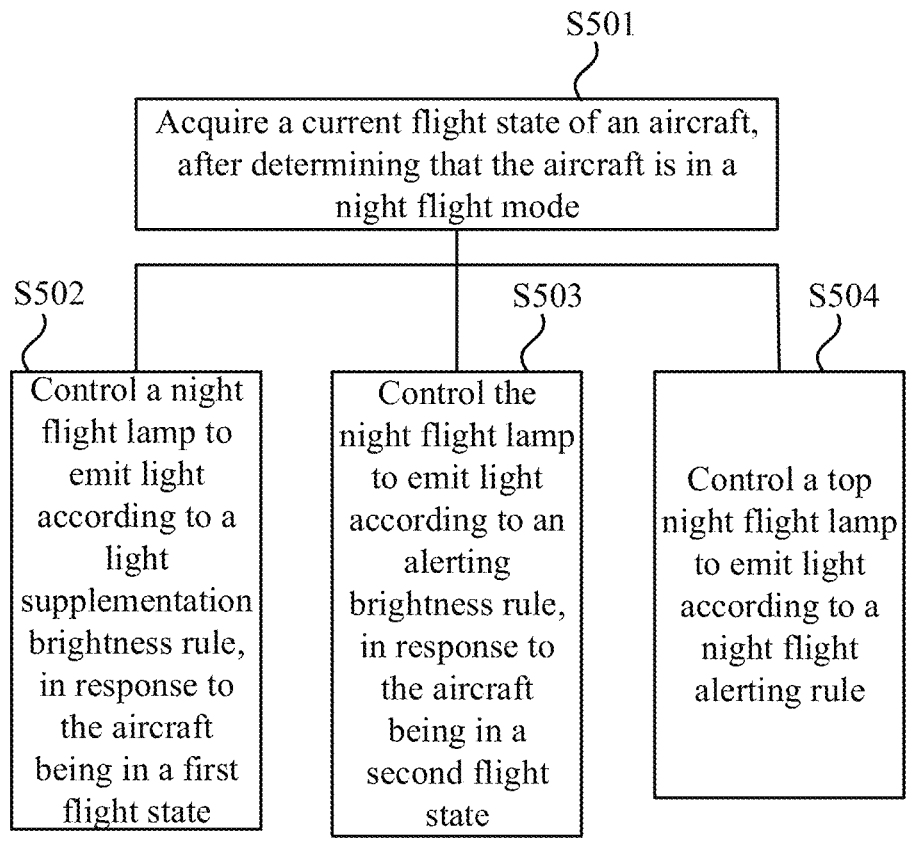
FIG. 5 is a schematic flowchart of another aircraft control method according to various exemplary embodiments of the present disclosure.

FIG. 5 is a schematic flowchart of another aircraft control method according to various exemplary embodiments of the present disclosure. In this method, a night flight lamp is provided on an aircraft (e.g., without a fill light or a light supplementation lamp). On one hand, the night flight lamp can provide a fill light function to a visual sensor of the aircraft to a certain extent. On another hand, the night flight lamp can also realize a light reminder function of the aircraft at night or in a dark environment. A night flight control of the aircraft can also be implemented by an independent control apparatus, or can be implemented by a control apparatus integrated on a remote controller of the aircraft or a flight controller of the aircraft. In the embodiments of the present disclosure, a position of the night flight lamp on the aircraft is associated with a position of the visual sensor on the aircraft. An association means that the night flight lamp and the visual sensor are on a same side or at a bottom of the aircraft, so that the night flight lamp can also achieve lighting supplementation effect (i.e., fill light function) for the visual sensor.

In S501, the control apparatus acquires a current flight state of the aircraft after determining that the aircraft is in a night flight mode. After determining the current flight state of the aircraft, in S502, in response to the aircraft being in a first flight state, the control apparatus controls the night flight lamp to emit light according to a light supplementation brightness rule. In S503, in response to the aircraft being in a second flight state, the control apparatus controls the night flight lamp to emit light according to an alerting brightness rule. Brightness configured by the light supplementation brightness rule is lower than brightness configured by the alerting brightness rule. For determining whether the aircraft is in the night flight mode, acquiring the flight state of the aircraft, and definitions of the first flight state and the second flight state, descriptions of related content in the foregoing embodiments can be referred to, which will not be repeated here. In some embodiments of the present disclosure, both the light supplementation brightness rule and the alerting brightness rule indicate that the night flight lamp is constantly on, and only different brightness is defined in these rules. In the first flight state, the light supplementation brightness rule mainly controls the night flight lamp to be constantly on to assist the visual sensor on the aircraft to capture environmental images on a ground or on sides. In the second flight state, a light emission reminder function for the aircraft according to the alerting brightness rule can be implemented at night or in a dark environment without a control user of the aircraft or other users being affected by glare of the night flight lamp.

In one embodiment, the aircraft is further provided with a top night flight lamp for realizing a night flight reminder function (i.e., at least two night flight lamps are configured on the aircraft, one on top, the other on the side or bottom). The top night flight lamp is provided on a top of the aircraft, and the top of the aircraft faces the sky during flight. The control apparatus may also control the top night flight lamp to emit light according to a night flight alerting rule in S504. In one embodiment, brightness indicated by the night flight alerting rule corresponds to the brightness configured by the aforementioned light supplementation brightness rule and the brightness configured by the alerting brightness rule, that is, the brightness indicated by the night flight alerting rule in the first flight state may be the same or substantially the same as the brightness configured by the light supplementation brightness rule, and the brightness indicated by the night flight alerting rule in the second flight state may be the same or substantially the same as the brightness configured by the alerting brightness rule. The brightness indicated by the night flight alerting rule may also be completely different from the brightness configured by the aforementioned light supplementation brightness rule and/or the brightness configured by the alerting brightness rule.

Based on the above-mentioned night flight lamp and the corresponding light supplementation brightness rule and the alerting brightness rule, the night flight lamp has both the aircraft night flight reminder function and the fill light function for the visual sensor, and when the above-mentioned light supplementation brightness rule, the alerting brightness rule, and the night flight alerting rule, are configured, the rules mentioned in the previous embodiments can be referred to. For example, the light supplementation brightness rule is the same as the above-mentioned light supplementation rule of the light supplementation lamp, the alerting brightness rule is the same as the above-mentioned alerting rule of the light supplementation lamp, and the night flight alerting rule is the same as the above-mentioned alerting rule of the night flight lamp. Operation troubles caused by close-range glare flashing to the user are avoided. Normal use of the downward-view light supplementation lamp is considered in the alerting rule of the light supplementation lamp. Through the embodiments of the present disclosure, a fuselage layout of the aircraft is not wasted, use functions are not reduced, and no additional burden is added.

Figure 6:
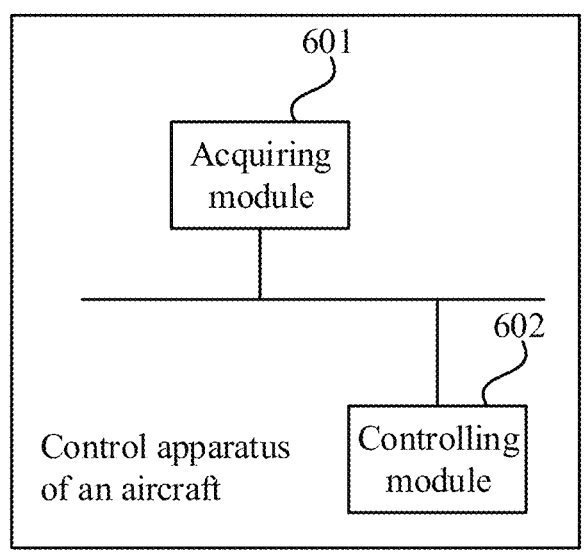
FIG. 6 is a schematic structural diagram of a control apparatus of an aircraft according to various exemplary embodiments of the present disclosure.

FIG. 6 is a schematic structural diagram of a control apparatus of an aircraft according to various exemplary embodiments of the present disclosure. An aircraft is provided with a light supplementation lamp to provide a fill light function for a visual sensor installed on the aircraft. A control apparatus according to the embodiments of the present disclosure can be provided on the aircraft, or on a remote controller used to control the aircraft, such as some dedicated remote controllers, or a smart terminal such as a smart phone, a tablet computer, or a smart wearable device, that can control the aircraft. The apparatus according to the embodiments of the present disclosure includes the following modules.

An acquiring module 601 is used to acquire a current flight state of the aircraft in response to the aircraft being in a night flight mode. A controlling module 602 is used to control the light supplementation lamp to emit light according to a light supplementation rule of the light supplementation lamp, in response to the aircraft being in a first flight state, that the light supplementation rule of the light supplementation lamp is a rule configured to control the light supplementation lamp to implement the fill light function in the night flight mode; and to control the light supplementation lamp to emit light according to an alerting rule of the light supplementation lamp, in response to the aircraft being in a second flight state, that the alerting rule of the light supplementation lamp is a rule configured to control the light supplementation lamp to implement an aircraft flight alerting function in the night flight mode.

In one embodiment, the aircraft is also provided with a night flight lamp, and the controlling module 602 is also used to control the night flight lamp to emit light according to an alerting rule of the night flight lamp. The alerting rule of the night flight lamp is a rule configured to control the night flight lamp to implement an aircraft flight reminder function in the night flight mode.

In one embodiment, when the controlling module 602 is used to control the night flight lamp to emit light according to the alerting rule of the night flight lamp, the controlling module 602 is used to control the night flight lamp to emit light according to a first alerting rule of the night flight lamp in response to the aircraft being in the first flight state, and the controlling module 602 is used to control the night flight lamp to emit light according to a second alerting rule of the night flight lamp in response to the aircraft being in the second flight state.

In one embodiment, the visual sensor and the light supplementation lamp are provided at a bottom of the aircraft, and the night flight lamp is provided on a top of the aircraft.

In one embodiment, when the controlling module 602 is used to acquire the current flight state of the aircraft, the controlling module 602 is used to determine the current flight state of the aircraft according to a flight parameter of the aircraft, and the flight parameter include an altitude of the aircraft and/or a flying distance between the aircraft and a control terminal. When the altitude is less than a first altitude threshold and/or the flying distance is less than a first distance threshold, the aircraft is in the first flight state, and when the altitude is greater than a second altitude threshold and/or the flying distance is greater than a second distance threshold, the aircraft is in the second flight state.

In one embodiment, when the controlling module 602 is used to control the light supplementation lamp to emit light according to the light supplementation rule of the light supplementation lamp, the controlling module 602 is used to control the light supplementation lamp to be constantly on according to the light supplementation rule of the light supplementation lamp, to provide the fill light function for the visual sensor provided on the aircraft.

In one embodiment, when the controlling module 602 is used to control the light supplementation lamp to emit light according to the alerting rule of the light supplementation lamp, the controlling module 602 is used to control the light supplementation lamp to emit light at brightness indicated by a preset medium brightness level, when the altitude of the aircraft is greater than the second altitude threshold and less than a third altitude threshold, according to instructions of the alerting rule of the light supplementation lamp, and control the light supplementation lamp to emit light at brightness indicated by a preset high brightness level, when the altitude of the aircraft is greater than a fourth altitude threshold, according to the instructions of the alerting rule of the light supplementation lamp.

In one embodiment, when the controlling module 602 is used to control the night flight lamp to emit light according to the first alerting rule of the night flight lamp in response to the aircraft being in the first flight state, the controlling module 602 is used to control the night flight lamp to emit light at brightness indicated by a preset low brightness level, according to instructions of the first alerting rule of the night flight lamp, when the altitude of the aircraft is less than a fifth altitude threshold.

In one embodiment, when the controlling module 602 is used to control the night flight lamp to emit light according to the second alerting rule of the night flight lamp in response to the aircraft being in the second flight state, the controlling module 602 is used to control the night flight lamp to emit light at brightness indicated by a preset medium brightness level, according to instructions of the second alerting rule of the night flight lamp, when the altitude of the aircraft is greater than a sixth altitude threshold and less than a seventh altitude threshold; or to control the night flight lamp to emit light at brightness indicated by a preset high brightness level, according to the instructions of the second alerting rule of the night flight lamp, when the altitude of the aircraft is greater than an eight altitude threshold.

In one embodiment, the controlling module 602 is also used to detect whether a night flight function button on a user interface is selected, and if so, determine that the aircraft is in the night flight mode.

For alternative implementations of the controlling module 602 mentioned above, reference may be made to descriptions of relevant content in the foregoing embodiments, which are not repeated here.

Based on the above-mentioned aircraft including the night flight lamp, the light supplementation lamp, and the visual sensor, and based on controlling of light emission of the night flight lamp and the light supplementation lamp based on the light supplementation rule of the light supplementation lamp, the alerting rule of the light supplementation lamp, and the alerting rule of the night flight lamp, a position of the aircraft in a night sky can be effectively marked, the light supplementation lamp is effectively used, needs for the aircraft to arrange other night flight lamps on an opposite side of the night flight lamp are avoided, weight and UAV power consumption are reduced, and the fill light function to the visual sensor is satisfied while the aircraft position alerting function is satisfied.

Figure 7:
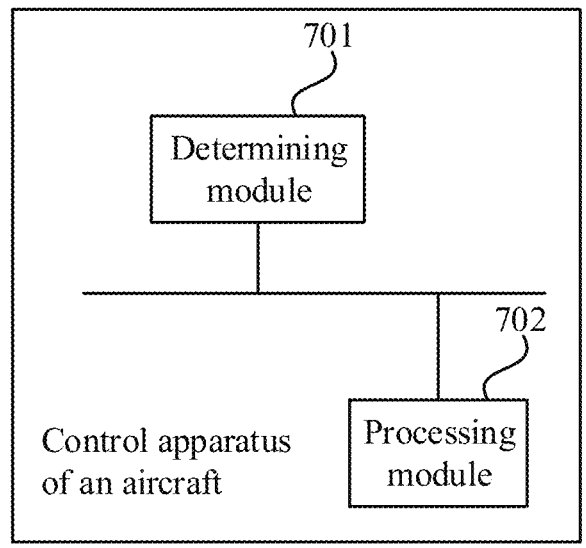
FIG. 7 is a schematic structural diagram of another control apparatus of an aircraft according to various exemplary embodiments of the present disclosure.

FIG. 7 is a schematic structural diagram of another control apparatus of an aircraft according to various exemplary embodiments of the present disclosure. An aircraft is provided with a night flight lamp, and a position of the night flight lamp on the aircraft is associated with a position of a visual sensor provided on the aircraft. A control apparatus according to the embodiments of the present disclosure can be provided on the aircraft, or on a remote controller used to control the aircraft, such as some dedicated remote controllers, or a smart terminal such as a smart phone, a tablet computer, or a smart wearable device, that can control the aircraft. The control apparatus according to the embodiments of the present disclosure includes the following modules.

A determining module 701 is configured to acquire a current flight state of the aircraft in response to the aircraft being in a night flight mode. A processing module 702 is configured to control the night flight lamp to emit light according to a light supplementation brightness rule in response to the aircraft being in a first flight state; and control the night flight lamp to emit light according to an alerting brightness rule in response to the aircraft being in a second flight state. Brightness configured by the light supplementation brightness rule is lower than brightness configured by the alerting brightness rule.

In one embodiment, the aircraft is further provided with a top night flight lamp for realizing a night flight reminder function. The top night flight lamp is provided on a top of the aircraft, and the top of the aircraft faces the sky during flight. The processing module 702 is also used to control the top night flight lamp to emit light according to a night flight alerting rule.

For alternative implementations of the processing module 702 mentioned above, reference may be made to descriptions of related content in the foregoing embodiments, which are not repeated here.

Based on the above-mentioned night flight lamp and the corresponding light supplementation brightness rule and the alerting brightness rule, the night flight lamp has both an aircraft night flight alerting function and a fill light function for the visual sensor. When the above-mentioned light supplementation brightness rule, the alerting brightness rule, and the night flight alerting rule, are configured, references can be made to rules mentioned in the previous embodiments. For example, the light supplementation brightness rule is the same as the above-mentioned light supplementation rule of the light supplementation lamp, the alerting brightness rule is the same as the above-mentioned alerting rule of the light supplementation lamp, the night flight alerting rule is the same as the above-mentioned alerting rule of the night flight lamp. Operation troubles caused by close-range glare flashing to a user are avoided, and normal use of the downward-view light supplementation lamp is considered in the alerting rule of the light supplementation lamp. Through the embodiments of the present disclosure, a fuselage layout of the aircraft is not wasted, use functions are not reduced, and no additional burden is added.

Figure 8:
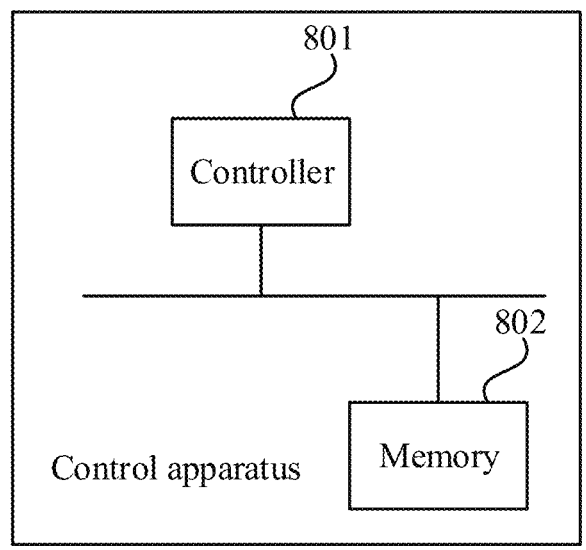
FIG. 8 is a schematic structural diagram of a control apparatus according to various exemplary embodiments of the present disclosure.

FIG. 8 is a schematic structural diagram of a control apparatus according to various exemplary embodiments of the present disclosure. A control apparatus is used to control a light supplementation lamp provided on an aircraft, and the light supplementation lamp is used to provide a fill light function to a visual sensor. The control apparatus includes a controller 801 and a memory 802. The control apparatus can also include other structures according to actual needs, for example, a wireless communication module used to achieve wireless communication with the aircraft, or a wired communication module used to achieve wired communication with the aircraft, and may also include some necessary modules such as a power module, etc.

The memory 802 may include a volatile memory, such as a random-access memory (RAM). The memory 802 may also include a non-volatile memory, such as a flash memory, a solid-state drive (SSD), etc. The memory 802 may also include a combination of the foregoing types of memories.

The controller 801 may be a central processing unit (CPU). The controller 801 may also include a hardware chip. The hardware chip involved may be an application-specific integrated circuit (ASIC), and the hardware chip may also be a programmable logic device (PLD), etc. The above-mentioned PLD may be a field-programmable gate array (FPGA), a general array logic (GAL), etc.

The controller 801 executes program instructions stored in the memory 802 to acquire a current flight state of the aircraft when the aircraft is in a night flight mode. In response to the aircraft being in a first flight state, the light supplementation lamp is controlled to emit light according to a light supplementation rule of the light supplementation lamp. The light supplementation rule of the light supplementation lamp is a rule configured to control the light supplementation lamp to implement a fill light function in the night flight mode. In response to the aircraft being in a second flight state, the light supplementation lamp is controlled to emit light according to an alerting rule of the light supplementation lamp. The alerting rule of the light supplementation lamp is a rule configured to control the light supplementation lamp to implement an aircraft flight alerting function in the night flight mode.

In one embodiment, the aircraft is also provided with a night flight lamp, and the controller 801 is also used to control the night flight lamp to emit light according to an alerting rule of the night flight lamp, and the alerting rule of the night flight lamp is a rule configured to control the night flight lamp to implement an aircraft flight reminder function in the night flight mode.

In one embodiment, when the controller 801 is used to control the night flight lamp to emit light according to the alerting rule of the night flight lamp, the controller 801 is used to control the night flight lamp to emit light according to a first alerting rule of the night flight lamp in response to the aircraft being in the first flight state, and to control the night flight lamp to emit light according to a second alerting rule of the night flight lamp in response to the aircraft being in the second flight state.

In one embodiment, when the controller 801 is used to acquire the current flight state of the aircraft, the controller 801 is used to determine the current flight state of the aircraft according to a flight parameter of the aircraft, and the flight parameter include an altitude of the aircraft and/or a flying distance between the aircraft and a control terminal. When the altitude is less than a first altitude threshold and/or the flying distance is less than a first distance threshold, the aircraft is in the first flight state, and when the altitude is greater than a second altitude threshold and/or the flying distance is greater than a second distance threshold, the aircraft is in the second flight state.

In one embodiment, when the controller 801 is used to control the light supplementation lamp to emit light according to the light supplementation rule of the light supplementation lamp, the controller 801 is used to control the light supplementation lamp to be constantly on according to the light supplementation rule of the light supplementation lamp, to provide the supplementation light function for the visual sensor provided on the aircraft.

In one embodiment, when the controller 801 is used to control the light supplementation lamp to emit light according to the alerting rule of the light supplementation lamp, the controller 801 is used to control the light supplementation lamp to emit light at brightness indicated by a preset medium brightness level, according to instructions of the alerting rule of the light supplementation lamp, when the altitude of the aircraft is greater than the second altitude threshold and less than a third altitude threshold, and/or the flying distance between the aircraft and the control terminal is greater than the second distance threshold and less than a third distance threshold; and control the light supplementation lamp to emit light at brightness indicated by a preset high brightness level, according to the instructions of the alerting rule of the light supplementation lamp, when the altitude of the aircraft is greater than a fourth altitude threshold, and/or the flying distance between the aircraft and the control terminal is greater than a fourth distance threshold.

In one embodiment, when the controller 801 is used to control the night flight lamp to emit light according to the first alerting rule of the night flight lamp in response to the aircraft being in the first flight state, the controller 801 is used to control the night flight lamp to emit light at brightness indicated by a preset low brightness level, according to instructions of the first alerting rule of the night flight lamp, when the altitude of the aircraft is less than a fifth altitude threshold and/or the flying distance between the aircraft and the control terminal is less than a fifth distance threshold.

In one embodiment, when the controller 801 is used to control the night flight lamp to emit light according to the second alerting rule of the night flight lamp in response to the aircraft being in the second flight state, the controller 801 is used to control the night flight lamp to emit light at brightness indicated by a preset medium brightness level, according to instructions of the second alerting rule of the night flight lamp, when the altitude of the aircraft is greater than a sixth altitude threshold and less than a seventh altitude threshold, and/or the flying distance between the aircraft and the control terminal is greater than a sixth distance threshold and less than a seventh distance threshold; or to control the night flight lamp to emit light at brightness indicated by a preset high brightness level, according to the instructions of the second alerting rule of the night flight lamp, when the altitude of the aircraft is greater than an eighth altitude threshold, and/or the flying distance between the aircraft and the control terminal is greater than an eighth distance threshold.

In one embodiment, the controller 801 is also used to detect whether a night flight function button on a user interface is selected, and if so, determine that the aircraft is in the night flight mode.

Based on the above-mentioned aircraft including the night flight lamp, the light supplementation lamp, and the visual sensor, and based on controlling of light emission of the night flight lamp and the light supplementation lamp provided on the aircraft based on the light supplementation rule of the light supplementation lamp, the alerting rule of the light supplementation lamp, and the alerting rule of the night flight lamp, a position of the aircraft in a night sky can be effectively marked, the light supplementation lamp is effectively used, needs for the aircraft to arrange other night flight lamps on an opposite side of the night flight lamp are eliminated, weight and UAV power consumption are reduced, and the fill light function to the visual sensor is satisfied while an aircraft position alerting function is satisfied.

In one embodiment of another control apparatus, a night flight lamp is provided on an aircraft connected to a control apparatus, and a position of the night flight lamp on the aircraft is associated with a position of a visual sensor provided on the aircraft. The control apparatus is only used to control the night flight lamp, and the control apparatus includes a controller and a memory. Structures of the control apparatus can also refer to FIG. 8. The control apparatus may also include other structures according to actual needs, for example, a wireless communication module used to realize wireless communication with the aircraft, or a wired communication module used to realize wired communication with the aircraft, and may also include some necessary modules, such as a power supply module, etc.

The memory may include a volatile memory, such as a RAM. The memory may also include a non-volatile memory, such as a flash memory, a SSD, etc. The memory may also include a combination of the above types of memories.

The controller may be a CPU. The controller may also include a hardware chip. The above hardware chip may be an ASIC, a PLD, etc. The above-mentioned PLD may be a FPGA, a GAL, etc.

The controller executes program instructions stored in the memory to acquire a current flight state of the aircraft in response to the aircraft being in a night flight mode. In response to the aircraft being in a first flight state, the controller controls the night flight lamp to emit light according to a light supplementation brightness rule. In response to the aircraft being in a second flight state, the controller controls the night flight lamp to emit light according to an alerting brightness rule. Brightness configured by the light supplementation brightness rule is lower than brightness configured by the alerting brightness rule.

The aircraft is also provided with a top night flight lamp for implementing a night flight reminder function. The top night flight lamp is provided on a top of the aircraft, and the top of the aircraft faces the sky during flight. The controller is further used to control the top night flight lamp to emit light according to a night flight alerting rule.

For alternative implementations of the controller mentioned above, references may be made to descriptions of relevant content in the foregoing embodiments, which are not repeated here.

Embodiments of an aircraft are also provided in the present disclosure, and an aircraft according to the embodiments includes a visual sensor, a night flight lamp, a light supplementation lamp to provide a fill light function for the visual sensor, and a control apparatus described in embodiments corresponding to FIG. 8. The aircraft also includes other structural modules required for a flight, such as flight controllers, power components, power modules, and so on. The control apparatus can be placed in the aircraft as an independent device, and the control apparatus can also exist in the aircraft as a part of functions of the flight controllers of the aircraft. As shown in FIG. 1, the visual sensor and the light supplementation lamp are provided at a bottom of the aircraft, and the night flight lamp is provided on a top of the aircraft.

The present disclosure also provides embodiments of another aircraft. An aircraft in the embodiments may include: a night flight lamp, a visual sensor, and a control apparatus. The aircraft also includes other structural modules required for a flight, for example, flight controllers, power components, power modules, etc. The control apparatus may be placed in the aircraft as an independent device, and the control apparatus may also exist in the aircraft as a part of functions of the flight controllers of the aircraft.

The control apparatus is used to acquire a current flight state of the aircraft in response to the aircraft being in a night flight mode. In response to the aircraft being in a first flight state, the control apparatus controls the night flight lamp to emit light according to a light supplementation brightness rule. In response to the aircraft being in a second flight state, the control apparatus controls the night flight lamp to emit light according to an alerting brightness rule. Brightness configured by the light supplementation brightness rule is lower than brightness configured by the alerting brightness rule.

In one embodiment, the aircraft is further provided with a top night flight lamp for realizing a night flight reminder function. The top night flight lamp is provided on a top of the aircraft, and the top of the aircraft faces the sky during flight. The control apparatus is also used to control the top night flight lamp to emit light according to a night flight alerting rule.

The above are only alternative implementations of the present disclosure, but the scope of protection of the present disclosure is not limited to these. Any person skilled in the art can easily think of changes or replacements within the technical scope disclosed in the present disclosure, which should be covered by the protection scope of the present disclosure. Therefore, the protection scope of the present disclosure shall be subject to the protection scope of the claims.

What is claimed is:

1. A control method, comprising:
   in response to an aircraft being in a night flight mode, acquiring a current flight state of the aircraft, the aircraft being provided with a visual sensor and a light supplementation lamp configured to provide a fill light function for the visual sensor;
   in response to the aircraft being in a first flight state, controlling the light supplementation lamp to emit light according to a light supplementation rule of the light supplementation lamp, wherein the light supplementation rule is configured to control the light supplementation lamp to emit light at a first brightness or emit light with a first frequency, to implement the fill light function in the night flight mode; and
   in response to the aircraft being in a second flight state, controlling the light supplementation lamp to emit light according to an alerting rule of the light supplementation lamp, wherein the alerting rule of the light supplementation lamp is configured to control the light supplementation lamp to emit light at a second brightness or to emit light with a second frequency, to implement an aircraft flight alerting function in the night flight mode, the second brightness being higher than the first brightness, and the second frequency being higher than the first frequency.

2. The method according to claim 1,
   wherein a night flight lamp is provided on the aircraft;
   the method further comprising:
      controlling the night flight lamp to emit light according to an alerting rule of the night flight lamp, wherein the alerting rule of the night flight lamp is configured to control the night flight lamp to implement an aircraft flight reminder function in the night flight mode.

3. The method according to claim 2, wherein controlling the night flight lamp to emit light according to the alerting rule of the night flight lamp includes:
   controlling the night flight lamp to emit light according to a first alerting rule of the night flight lamp in response to the aircraft being in the first flight state; and
   controlling the night flight lamp to emit light according to a second alerting rule of the night flight lamp in response to the aircraft being in the second flight state.

4. The method according to claim 3, wherein controlling the night flight lamp to emit light according to the first alerting rule of the night flight lamp in response to the aircraft being in the first flight state includes:
   in response to an altitude of the aircraft being less than an altitude threshold, and/or a flying distance between the aircraft and a control terminal being less than a distance threshold, controlling the night flight lamp to emit light at a preset low brightness level, according to the first alerting rule of the night flight lamp.

5. The method according to claim 3, wherein controlling the night flight lamp to emit light according to the second alerting rule of the night flight lamp in response to the aircraft being in the second flight state includes:
   in response to an altitude of the aircraft being greater than a first altitude threshold and less than a second altitude threshold, and/or a flying distance between the aircraft and the control terminal being greater than a first distance threshold and less than a second distance threshold, controlling the night flight lamp to emit light at a preset medium brightness level, according to the second alerting rule of the night flight lamp; or
   in response to the altitude of the aircraft being greater than a third altitude threshold, and/or the flying distance between the aircraft and the control terminal being greater than a third distance threshold, controlling the night flight lamp to emit light at a preset high brightness level, according to the second alerting rule of the night flight lamp.

6. The method according to claim 2, wherein:
   the visual sensor and the light supplementation lamp are provided at a bottom of the aircraft, and the night flight lamp is provided on a top of the aircraft.

7. The method according to claim 1, wherein acquiring the current flight state of the aircraft includes:
   determining the current flight state of the aircraft according to a flight parameter of the aircraft, the flight parameter including an altitude of the aircraft and/or a flying distance between the aircraft and a control terminal;
   wherein:
      in response to the altitude being less than a first altitude threshold and/or the flying distance being less than a first distance threshold, the aircraft is determined as in the first flight state; and in response to the altitude being greater than a second altitude threshold and/or the flying distance being greater than a second distance threshold, the aircraft is determined as in the second flight state.

8. The method according to claim 1, wherein controlling the light supplementation lamp to emit light according to the light supplementation rule of the light supplementation lamp includes:

controlling the light supplementation lamp to be constantly on according to the light supplementation rule of the light supplementation lamp, to provide the fill light function for the visual sensor provided on the aircraft.

9. The method according to claim 1, wherein controlling the light supplementation lamp to emit light according to the alerting rule of the light supplementation lamp includes:

in response to an altitude of the aircraft being greater than a first altitude threshold and less than a second altitude threshold, and/or a flying distance between the aircraft and a control terminal being greater than a first distance threshold and less than a second distance threshold, controlling the light supplementation lamp to emit light at a preset medium brightness level, according to the alerting rule of the light supplementation lamp; or in response to the altitude of the aircraft being greater than a third altitude threshold, and/or the flying distance between the aircraft and the control terminal being greater than a third distance threshold, controlling the light supplementation lamp to emit light at a preset high brightness level, according to the instructions of the alerting rule of the light supplementation lamp.

10. The method according to claim 1, further comprising: detecting whether a night flight function button on a user interface is selected, and determining that the aircraft is in the night flight mode in response to the night flight function button being selected.

11. A control apparatus comprising:
at least one processor; and
at least one memory including computer program code, wherein the at least one memory and the computer program code are configured, with the at least one processor, to cause the control apparatus to at least:

in response to an aircraft being in a night flight mode, acquire a current flight state of the aircraft, the aircraft being provided with a visual sensor and a light supplementation lamp configured to provide a fill light function for the visual sensor;

in response to the aircraft being in a first flight state, control the light supplementation lamp to emit light according to a light supplementation rule of the light supplementation lamp, wherein the light supplementation rule is configured to control the light supplementation lamp to emit light at a first brightness or emit light with a first frequency, to implement the fill light function in the night flight mode; and in response to the aircraft being in a second flight state, control the light supplementation lamp to emit light according to an alerting rule of the light supplementation lamp, wherein the alerting rule of the light supplementation lamp is configured to control the light supplementation lamp to emit light at a second brightness or to emit light with a second frequency, to implement an aircraft flight alerting function in the night flight mode, the second brightness being higher than the first brightness, and the second frequency being higher than the first frequency.

12. The control apparatus according to claim 11, wherein:
a night flight lamp is provided on the aircraft; and
the at least one memory and the computer program code are further configured, with the at least one processor, to cause the control apparatus to:

control the night flight lamp to emit light according to an alerting rule of the night flight lamp, wherein the alerting rule of the night flight lamp is configured to control the night flight lamp to implement an aircraft flight reminder function in the night flight mode.

13. The control apparatus according to claim 12, wherein the at least one memory and the computer program code are further configured, with the at least one processor, to cause the control apparatus to:

control the night flight lamp to emit light according to a first alerting rule of the night flight lamp in response to the aircraft being in the first flight state; and control the night flight lamp to emit light according to a second alerting rule of the night flight lamp in response to the aircraft being in the second flight state.

14. The control apparatus according to claim 13, wherein the at least one memory and the computer program code are further configured, with the at least one processor, to cause the control apparatus to:

in response to an altitude of the aircraft being less than an altitude threshold, and/or a flying distance between the aircraft and a control terminal being less than a distance threshold, control the night flight lamp to emit light at a preset low brightness level according to the first alerting rule of the night flight lamp.

15. The control apparatus according to claim 13, wherein the at least one memory and the computer program code are further configured, with the at least one processor, to cause the control apparatus to:

in response to an altitude of the aircraft being greater than a first altitude threshold and less than a second altitude threshold, and/or a flying distance between the aircraft and a control terminal being greater than a first distance threshold and less than a second distance threshold, control the night flight lamp to emit light at a preset medium brightness level according to the second alerting rule of the night flight lamp; or in response to the altitude of the aircraft being greater than a third altitude threshold, and/or the flying distance between the aircraft and the control terminal being greater than a third distance threshold control the night flight lamp to emit light at a preset high brightness level according to the second alerting rule of the night flight lamp.

16. The control apparatus according to claim 11, wherein the at least one memory and the computer program code are further configured, with the at least one processor, to cause the control apparatus to:

determine the current flight state of the aircraft according to a flight parameter of the aircraft, the flight parameter including an altitude of the aircraft and/or a flying distance between the aircraft and a control terminal;

wherein:

in response to the altitude being less than a first altitude threshold and/or the flying distance being less than a first distance threshold, the aircraft is determined as in the first flight state; and in response to the altitude being greater than a second altitude threshold and/or the flying distance being greater than a second distance threshold, the aircraft is determined as in the second flight state.

17. The control apparatus according to claim 11, wherein the at least one memory and the computer program code are further configured, with the at least one processor, to cause the control apparatus to:
control the light supplementation lamp to be constantly on according to the light supplementation rule of the light supplementation lamp, to provide the fill light function for the visual sensor provided on the aircraft.

18. The control apparatus according to claim 11, wherein the at least one memory and the computer program code are further configured, with the at least one processor, to cause the control apparatus to:
in response to an altitude of the aircraft being greater than a first altitude threshold and less than a second altitude threshold, and/or a flying distance between the aircraft and a control terminal being greater than a first distance threshold and less than a second distance threshold, control the light supplementation lamp to emit light at a preset medium brightness level according to the alerting rule of the light supplementation lamp; or
in response to the altitude of the aircraft being greater than a third altitude threshold, and/or the flying distance between the aircraft and the control terminal being greater than a third distance threshold, control the light supplementation lamp to emit light at a preset high brightness level according to the instructions of the alerting rule of the light supplementation lamp.

19. An aircraft comprising:
a night flight lamp;
a visual sensor;
at least one processor; and
at least one memory including computer program code, wherein the at least one memory and the computer program code are configured, with the at least one processor, to cause the aircraft to at least:
in response to the aircraft being in a night flight mode, acquire a current flight state of the aircraft;
in response to the aircraft being in a first flight state, control the night flight lamp to emit light according to a light supplementation brightness rule; and
in response to the aircraft being in a second flight state, control the night flight lamp to emit light according to an alerting brightness rule of the night flight lamp, wherein brightness configured by the light supplementation brightness rule is lower than brightness configured by the alerting brightness rule.

20. The aircraft according to claim 19, further comprising:
a top night flight lamp for realizing a night flight reminder function, the top night flight lamp being provided on a top of the aircraft, and the top of the aircraft facing a sky during flight;
wherein the at least one memory and the computer program code are further configured, with the at least one processor, to cause the aircraft to control the top night flight lamp to emit light according to a night flight alerting rule.

* * * * *